United States Patent [19]

Katoh et al.

[11] Patent Number: 5,734,937
[45] Date of Patent: Mar. 31, 1998

[54] LENS BARREL STANDARD POSITION DETECTION DEVICE AND METHOD

[75] Inventors: Minoru Katoh, Kawasaki; Kiyosada Machida, Urawa; Junichi Omi, Kawasaki, all of Japan

[73] Assignee: Nikon Corporation, Tokyo, Japan

[21] Appl. No.: 583,839

[22] Filed: Jan. 11, 1996

[30] Foreign Application Priority Data

Feb. 24, 1995 [JP] Japan .................. 7-036689

[51] Int. Cl.[6] .................................. G03B 17/00
[52] U.S. Cl. ........................................... 396/87
[58] Field of Search .................. 354/187, 195.12; 396/87, 90, 103, 134

[56] References Cited

U.S. PATENT DOCUMENTS

| | | | |
|---|---|---|---|
| 4,827,296 | 5/1989 | Haraguchi et al. | 354/187 |
| 5,153,626 | 10/1992 | Yamamoto | 354/187 |
| 5,278,602 | 1/1994 | Honma et al. | 354/406 |
| 5,287,137 | 2/1994 | Hara et al. | 354/194.12 |
| 5,307,103 | 4/1994 | Machida | 354/195.1 |
| 5,543,971 | 8/1996 | Nomura et al. | 359/697 |

Primary Examiner—Safet Metjahic
Assistant Examiner—Christopher E. Mahoney

[57] ABSTRACT

A lens barrel standard position detection device, attached to a lens barrel equipped with a fixed tube having a first member and a movable tube rotationally moving back and forth along an optical axis of the lens barrel and having a second member engaging the first member of the fixed tube, to detect when the movable tube reaches a predetermined standard position. The lens barrel standard position detection device includes an actuating element movable between a first position and a second position, the actuating element moving to the second position when a working plane portion of the second member moves into contact with the actuating element corresponding to the movable tube reaching the predetermined standard position along the optical axis, an urging member which maintains the actuating element in the first position in a normal state due to an urging force of the urging member, and a detection unit which detects when the actuating element moves to the second position which opposes the urging force of the urging member, thereby detecting the movable tube reaching the predetermined standard position.

20 Claims, 7 Drawing Sheets

LENS BARREL STANDARD POSITION DETECTION DEVICE AND METHOD

BACKGROUND OF THE INVENTION

1. Field of the Invention

The present invention relates to a lens barrel standard position detection device, and more particularly, to a lens barrel standard position detection device applied to a collapsible mount type camera equipped with a zoom type lens barrel to perform telephoto/wide angle photography by driving a plurality of lens groups in the optical axis direction, which zoom type lens barrel is freely extendable from and retractable into the camera body.

2. Description of the Related Art

In conventional compact cameras having a zoom lens to perform telephoto to wide angle photography, the lens barrel of the zoom lens includes at least two lens groups which are arranged to be freely movable back and forth. The focal length is changed by changing the interval between each lens group, and telephoto or wide angle photography can be performed by optical magnification. A conventional zoom type lens barrel typically includes a fixed barrel, a tube movable back and forth in the optical axis direction and helicoidally coupled to the fixed barrel, and a plurality of lens groups retained in a lens holder which is movable in the optical axis direction within the fixed barrel. Rotational transmission is performed from a rotational drive source, such as an electric motor, to a gear portion formed in a portion of the movable tube. While rotating the movable tube, by causing it to move back and forth in the optical axis direction, the lens holders within the movable tube are moved back and forth in the optical axis direction to adjust the spacing between the lens groups and to change the combined focal length of the lens groups.

Moreover, in order to make the conventional compact camera with the zoom lens small and thin, the zoom type lens barrel retracts into the camera body. The zoom lens barrel includes a collapsible mount type to perform continuous retraction of the whole lens barrel into the camera body or extension from the camera body, in the zooming action of the zoom lens barrel. An electric motor causes the rotation of a movable tube of the lens barrel to drive the extension and retraction of the lens barrel, in addition to the zooming drive. However, when the main battery of the camera is OFF, the extended position or retracted position of the lens barrel cannot be confirmed.

Detection devices have thus been developed to detect the movement position of the lens barrel using rectilinear motion of the optical axis in the movable tube constituting the lens barrel, or the rotation in the circumferential direction of the movable tube, by installing, for example, a brush contact switch or an encoder detection device. The conventional detection devices which detect the rectilinear motion or rotary motion of the optical axis of the movable tube in the fixed tube constituting the lens barrel are set up on the outer circumference of the fixed tube. This results in a relatively large external diameter of the lens barrel, which is contrary to the requirement for compactness. That is, in order to detect the rectilinear motion or rotary motion of the movable tube by such a detection device, it is necessary to set up a portion of the detection device on the inner circumference or outer circumference of the fixed tube. In the former case, the problem is that the diameter of the lens barrel itself becomes large. In the latter case, it is necessary to set up a groove or the like in the movable tube, which increases the overall size.

Furthermore, setting up the detection device to detect all the movements of the movable tube, without the device becoming complicated and large, results in poor position accuracy. As a result, a position detection device is known which detects movement in a portion of the movement range along the optical axis of the movable tube, referred to as a standard position. Also known is a device which detects movement of the movable tube from the standard position to detect the position of a lens barrel by counting with a calculating device. Though using such a device to detect the movement extending over the whole body of the movable tube may simplify the proportionally large or small structure, the device is still not yet sufficient, both from a structural aspect and from a practical aspect of compactness. This is because the camera is bulky, installation is not easily performed, there is no significant cost reduction, and the camera cannot reliably perform the detection of the precise position of the lens barrel.

SUMMARY OF THE INVENTION

Considering the above-noted problems, it is an object of the present invention to provide a lens barrel standard position detection device which detects a standard position of a lens barrel which moves back and forth in the optical axis direction having a simple structure.

It is a further object of the present invention to provide the lens barrel standard position detection device which is reliable and accurate.

Yet another object of the present invention is to provide a smaller compact camera having the lens barrel standard position detection device, which is also easy to assemble and reduces the cost of the camera.

The objects of the present invention are achieved by providing a camera having a zoom type lens barrel for telephoto and wide angle photography, which zoom type lens barrel extends from and retracts into a body of said camera in a direction of an optical axis of said zoom type lens barrel, comprising: a fixed tube of the zoom type lens barrel integrally fixed to a frame of the camera body and having a female helicoid member on an inner circumferential portion of the fixed tube; a movable tube of the zoom type lens barrel which rotationally moves along the optical axis to retract and extend the zoom type lens barrel, the movable tube having a male helicoid member on an outer circumferential portion of the movable tube which engages the female helicoid member of the fixed tube; and a lens barrel standard position detection device, arranged on an outer circumferential portion of the fixed tube, to detect when the movable tube reaches a predetermined standard position on the optical axis.

The objects of the present invention are further achieved by providing a lens barrel standard position detection device attached to a lens barrel equipped with a fixed tube having a female helicoid member and a movable tube rotating back and forth along an optical axis and having a male helicoid member engaging the female helicoid member of the fixed tube, the lens barrel standard position detection device comprising: an actuating element movable between a first position and a second position, the actuating element moving to the second position when a working plane portion of a crest of the male helicoid member moves into contact with the actuating element corresponding to the movable tube reaching a predetermined standard position along the optical axis; an urging member which maintains the actuating member in the first position in a normal state due to an urging force of the urging member; and a detection unit which detects when the actuating element moves to the second position which opposes the urging force of the urging member, thereby detecting the movable tube reaching the predetermined standard position.

The objects of the present invention are also achieved by providing a method of detecting when a movable tube of a zoom type lens barrel reaches a predetermined standard position on an optical axis of the zoom type lens, comprising the steps of: moving the movable tube along the optical axis; urging an actuating member to remain in a first position; moving a working plane portion of a crest of a male helicoid member of the movable tube into contact with the actuating element corresponding to the movable tube reaching the predetermined standard position; moving the actuating element to a second position when the working plane portion of the crest of the male helicoid member of the movable tube contacts the actuating element corresponding to the movable tube reaching the predetermined standard position; and detecting when the actuating element moves to the second position.

Additional objects and advantages of the invention will be set forth in part in the description which follows, and in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which:

FIG. 4(a) shows the collapsed state, FIG. 4(b) shows the Wide state, and FIG. 4(c) shows the Tele state.

FIG. 5(a) shows the Wide state, and FIG. 5(b) shows the collapsed state.

DESCRIPTION OF THE PREFERRED EMBODIMENTS

Figure 1:
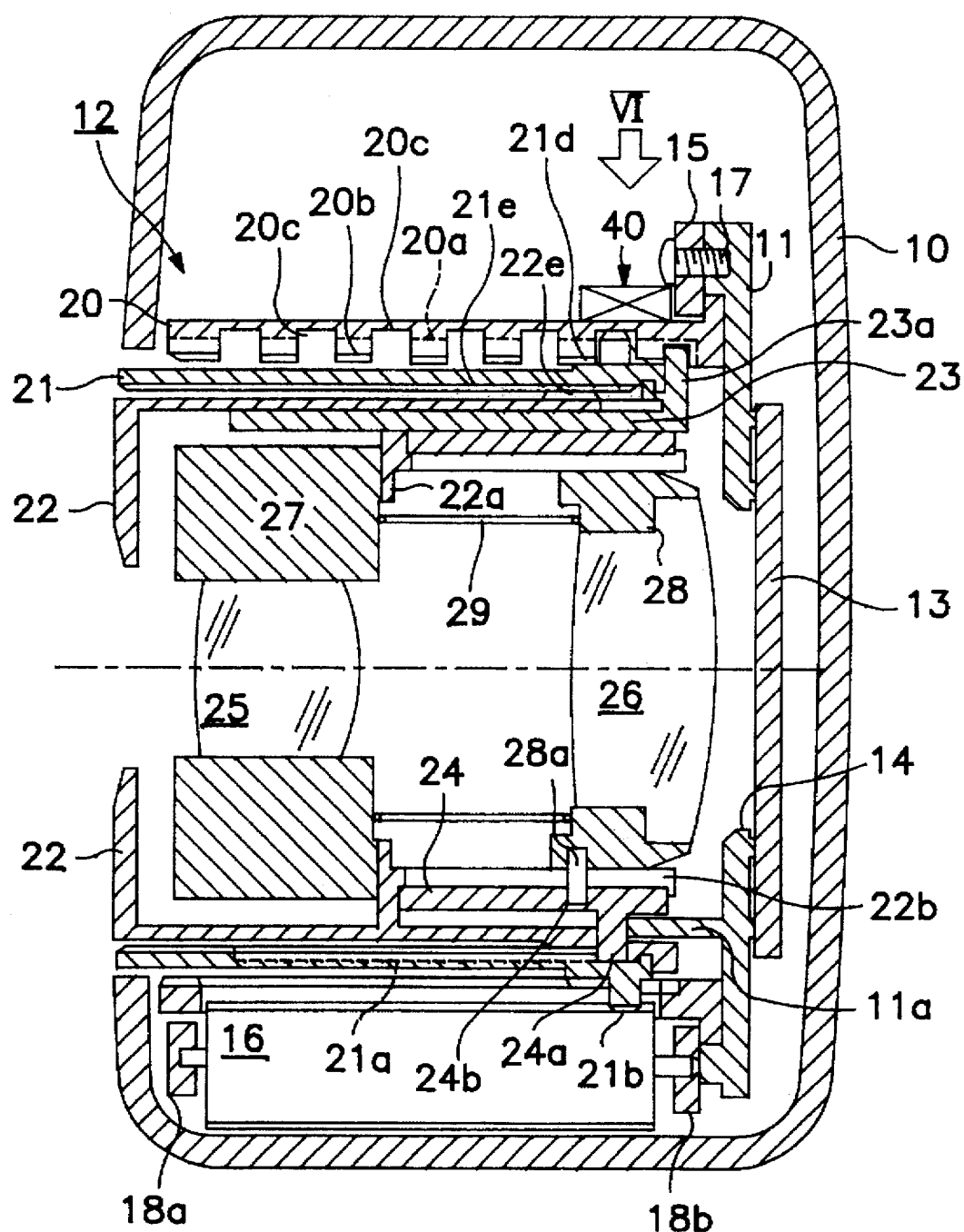
FIG. 1 is a cross-sectional diagram showing a collapsed state of a camera having a zoom type lens barrel and a lens barrel standard position detection device in accordance with a preferred embodiment of the present invention.

Reference will now be made in detail to the present preferred embodiments of the present invention, examples of which are illustrated in the accompanying drawings, wherein like reference numerals refer to like elements throughout.

Figure 2:
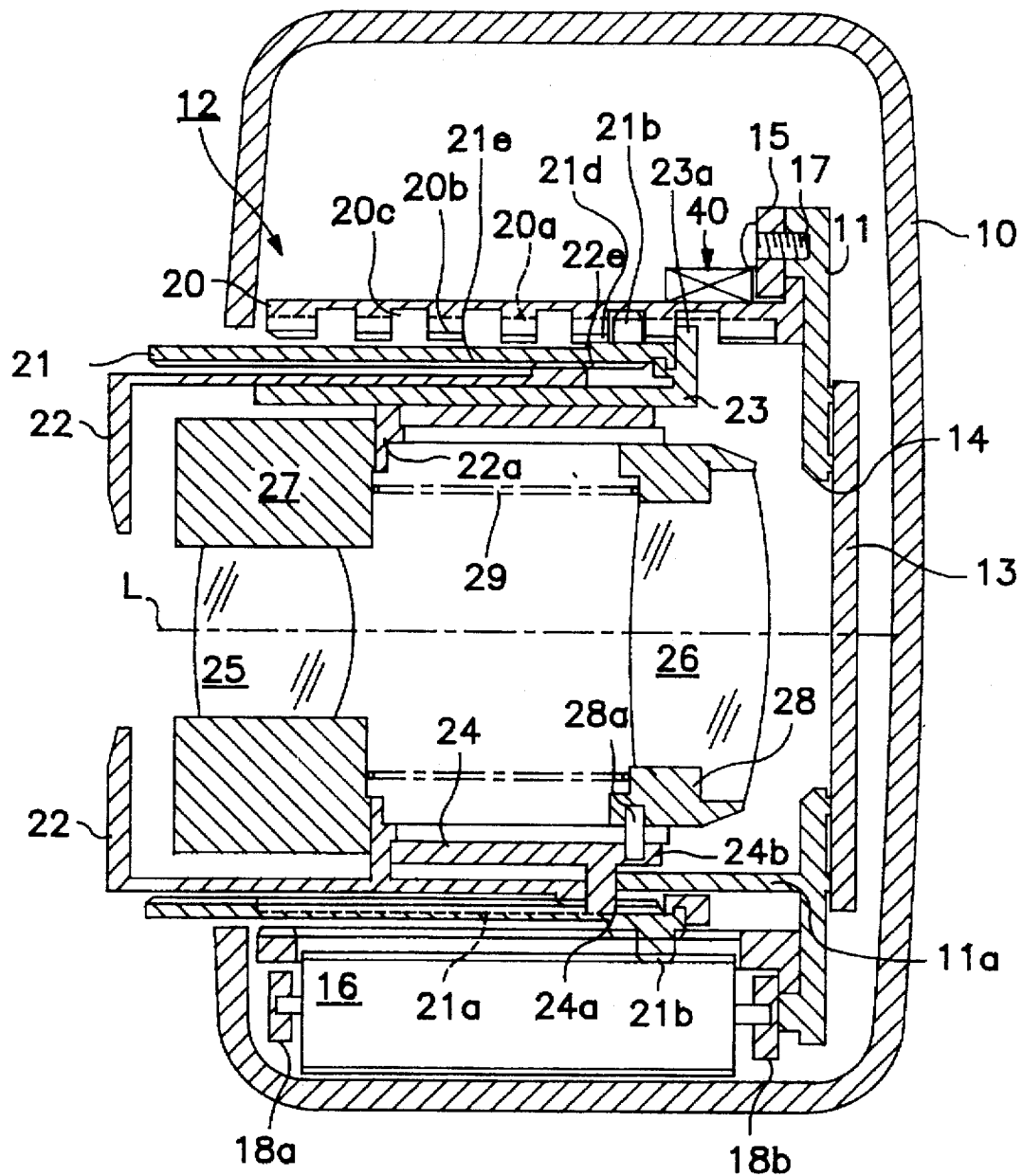
FIG. 2 is a cross-sectional diagram showing a Wide (wide angle) state of the zoom type lens barrel in the camera of FIG. 1.
Figure 3:
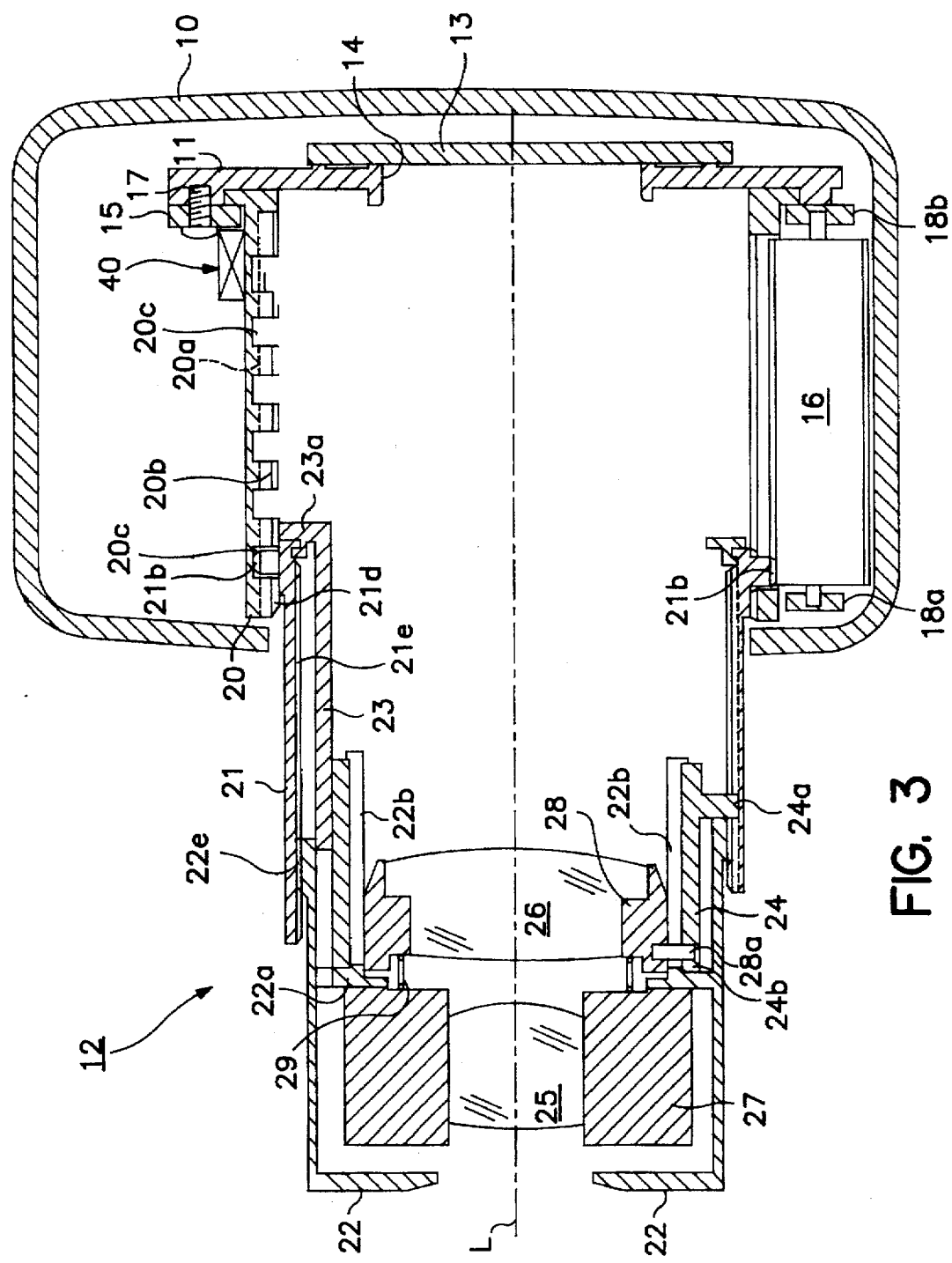
FIG. 3 is a cross-sectional diagram showing a Tele (telephoto) state of the zoom type lens barrel in the camera of FIG. 1.

Referring to FIGS. 1-3, a camera body frame 11 is disposed within a camera body 10, and a zoom type lens barrel 12, capable of extension from and retraction into the central aperture of the front of the camera body 10, is disposed in the camera body frame 11. Pressure plate 13 is arranged to form a film path for the photographic film (not shown) to travel, and is on the rear surface of an aperture 14 formed in the approximate center of the camera body frame 11. The zoom type lens barrel 12 is equipped with a fixed tube 20, which is a fixed side member disposed in the optical axis direction and integrally fixed to the front surface of the camera body frame 11; a helicoid ring 21, which is a movable tube arranged to fit helicoidally into fixed tube 20; and a lens barrel body 22 which constitutes a portion of a first lens group support frame helicoidally fitting into the inner circumference of the helicoid ring 21.

Furthermore, arranged in an interior portion of the lens barrel 22 are a rectilinear ring 23, which is a second movable tube, movably disposed in a relatively freely rotatable state and integrally movable in the optical axis direction on the film surface side of the helicoid ring 21; and a zoom cam 24 which is a rotary drive cam member accompanying the rotation of the helicoid ring 21. First and second lens groups 25 and 26 are also disposed in the interior of the lens barrel body 22 to move in the optical axis direction. Each lens group 25 and 26 has a lens shutter mechanism (not shown) maintained as a shutter portion by a lens frame unit 27 and a lens holder 28, respectively. Moreover, L denotes the optical axis of the lens groups 25 and 26.

The rectilinear ring 23 is integrally movable in the optical axis direction, and relatively rotationally displaceable in the direction of rotation, with respect to the helicoid ring 21. A rotation of projection portion 23a of rectilinear ring 23 is controlled due to a coupling with the rectilinear groove portion 20a disposed parallel to the optical axis L of the fixed tube 20. Moreover, the zoom cam ring 24 is fitted, for free rotation, on the outer circumference of the guide portion 22a of the lens barrel body 22. The projecting portion 24a of the outer circumference, due to coupling with the rectilinear groove 21a parallel to the optical axis L of the helicoid ring 21, is itself constituted to rotate accompanying the rotation of the helicoid ring 21.

A female helicoid 20b of the inner circumferential portion of fixed tube 20 engages an outer circumferential male helicoid 21d of the helicoid ring 21, as shown in FIGS. 1-3. A helical groove 20c is also formed in the inner circumference of the fixed tube 20. The groove 20c, as shown in FIG. 1 or FIG. 3, prevents interference with the gear portion 21b which is disposed on the outer circumferential portion of the helicoid ring 21 rotatingly moving in the optical axis direction. Moreover, a female helicoid 21e of the inner circumference of the helicoid ring 21 engages a male helicoid 22e disposed on the outer circumference of the lens barrel body 22.

Drive gear 16 transmits a drive force from an electric motor and the like (not shown) in the camera body 10, to engage the gear portion 21b formed in a portion of the outer circumference of the helicoid ring 21. Due to the drive force transmission, the extension and collapse are performed by the helicoid ring 21, the rectilinear ring 23, the lens barrel body 22, and the zoom cam ring 24 of the lens barrel 12. Further due to the drive force transmission, the zooming action is performed which obtains the back and forth movement on the optical axis L of the first and second lens groups 25 and 26 (in this case, the second lens group 26). For example, drive gear 16 may include a gear of the same diameter dimension formed along the optical axis direction or plural gears in the necessary region. Moreover, in FIG. 1, compression member 15 is held fast by a screw 17 pressing the rear end flange of the fixed tube 20 with respect to the front surface of the camera body frame 11. Support members 18a and 18b support the respective ends of the gear shaft of the drive gear 16, and are fixed in the camera body frame 11 (not shown).

The lens holder 28 supports the second lens group 26. Plural guide pins 28a project from its rear end surface and insert into the guide groove 22b in the guide portion 22a of the lens barrel body 22. The guide groove 22b is formed parallel to the optical axis L in the circumferential direction of the guide portion 22a, controls the rotation of the second lens group 26 and also controls the movement stroke of the guide portion 22a of the lens barrel body 22. Moreover, to prevent shaking, a compression coil spring 29 is disposed between the lens holder 28 and the lens frame portion 27 which support the first lens group 25 and conjointly act as shutter portions, urging the second lens group 26 towards the film surface (the rear surface side of the camera body 10). A cam groove 24b is formed in the circumferential direction in the zoom cam 24, to cause the second lens group 26 to move back and forth along the guide groove 22b of the guide portion 22a of the lens barrel body 22. A zoom groove is formed which crosses the optical axis L at a predetermined angle and couples to the tip portions of the guide pins 28a inserted into the guide groove 22b.

By rotationally driving the helicoid ring 21, which is the movable tube, the lens barrel body 22, which is the first lens group frame which supports the first lens group 25, is caused to move back and forth in the optical axis direction. In addition, the helicoid ring 21 itself is caused to move back and forth in the optical axis direction. Furthermore, by the helicoid ring 21 and the zoom cam 24, which is a rotated drive cam member, the lens holder 28, which is a second lens group frame which supports the second lens group 26, moves back and forth in the optical axis direction while rotating, due to the cam coupling of the guide pins 28a and the rectilinear groove 22b and the cam groove 24b. Thus, zooming to the wide angle can be performed as desired.

In particular, because the amount of movement of the first lens group 25 during zooming becomes known from the amount of movement of the lens barrel body 22 with respect to the helicoid ring 21, and the amount of movement of this helicoid ring 21 itself with respect to the fixed tube 20, the length of this helicoid ring 21 in the optical axis direction can be kept to a minimum limit, and also high magnification zooming is possible. As a result of maintaining high magnification zoom, and also keeping the length in the optical axis direction of the helicoid ring 21 short, a compact or thin form camera body 10 can be attained in which the helicoid ring 21 or the lens barrel body 22 are housed. Such an advantage is effectively manifested in a collapsible mount type camera of this embodiment, but is of course not limited to this manifestation.

Figure 4C:
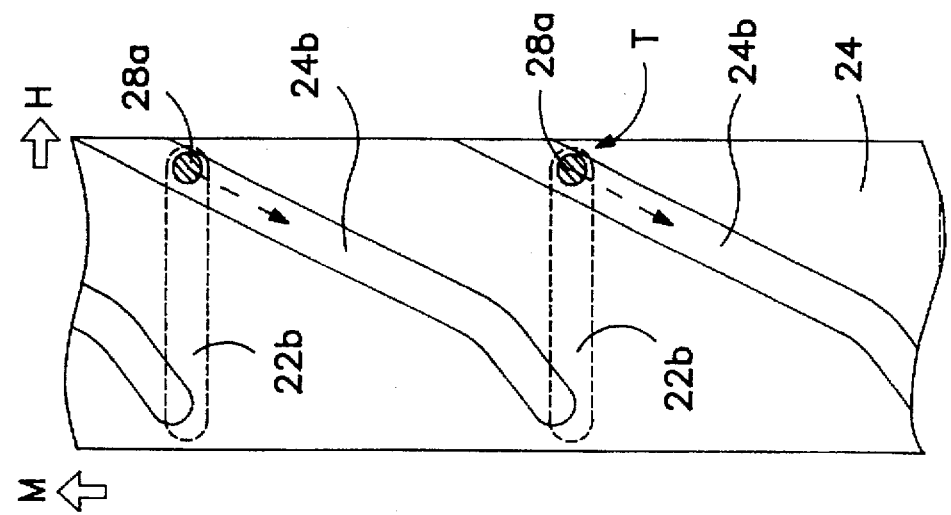
FIGS. 4(a) 4(b) and 4(c) are development diagrams of a zoom cam ring showing the state and relationship of a guide groove and a cam groove.

Due to the arrangement of the zoom type lens barrel 12 in camera body 10 according to the present invention, in the Tele state of FIG. 3, the guide pins 28a as shown in FIG. 4(c) are positioned in the Tele position T of the photographic subject side (direction of the arrow H in the drawings) of the guide groove 22b. In this state, due to the drive of a drive device (not shown), the helicoid 21 is caused to rotate in the retraction direction and the zoom cam 24 rotates in the direction of the arrow M in the drawing. Because the cam groove 24b moves in the upwards direction in the drawing, the guide pins 28a are pressed by the groove wall surface of the cam groove 24b, and therefore move along the guide groove unit 22b in the film surface direction (opposite of the direction of the arrow H in the drawings).

Figure 4B:
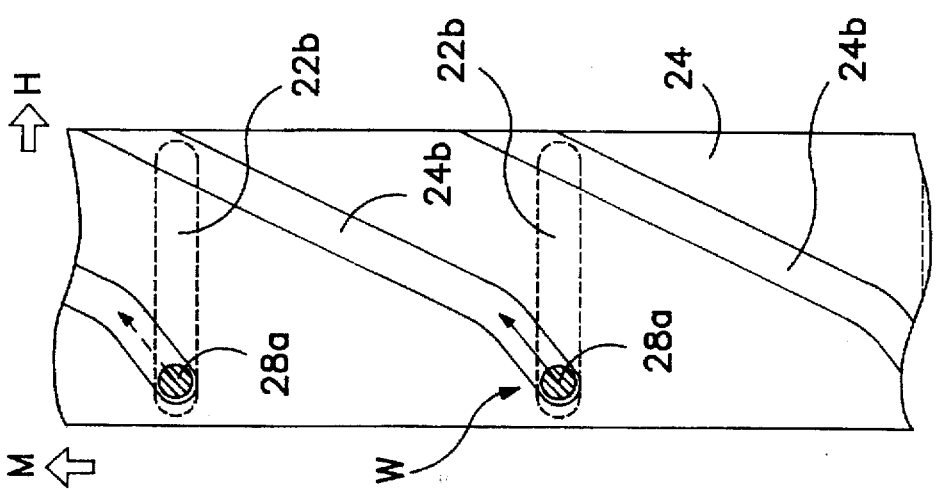

As shown in FIG. 4(b), the guide pins 28a move to the guide position W of the film surface side of the guide groove 22b, in accordance with the Wide state shown in FIG. 2. In the case of performing an operation of retraction thereafter (i.e., a collapse action), the prior art continuously forms a collapsing cam groove portion for continuous collapsing use formed in the film surface side of the cam groove 24b, moves in the photographic subject direction (arrow H in the drawing) and enters the collapsed state. According to the present invention, however, as can be clearly seen from FIGS. 4(a), (b) and (c), the prior art collapsing region is not present in the cam groove 24b, because the present invention performs the collapsing operation as described below.

Figure 5A:
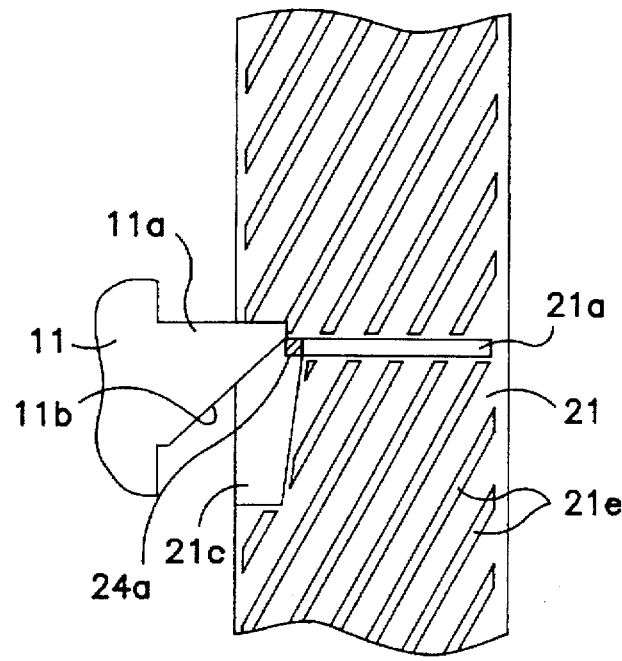
FIGS. 5(a) and 5(b) are development diagrams of a helicoid ring.

Namely, as shown in FIGS. 4(c) and (b), the guide pins 28a are in a state positioned in the Tele position T or the Wide position W. Because the projecting portion 24a of the zoom cam 24 is engaged in the rectilinear groove 21a of the helicoid ring 21, the zoom cam ring 24 rotates together with the helicoid ring 21. Thus, the guide pins 28a move to the film surface side along the guide grooves 22b, and the second lens group 26 similarly moves to the film surface side. Furthermore, when continuing the retraction operation, as shown in FIG. 5(a), the projecting portion 24a of the zoom cam ring 24 strikes against the sloping surface 11b of the protruding portion 11a arranged in the camera body frame 11.

Figure 4A:
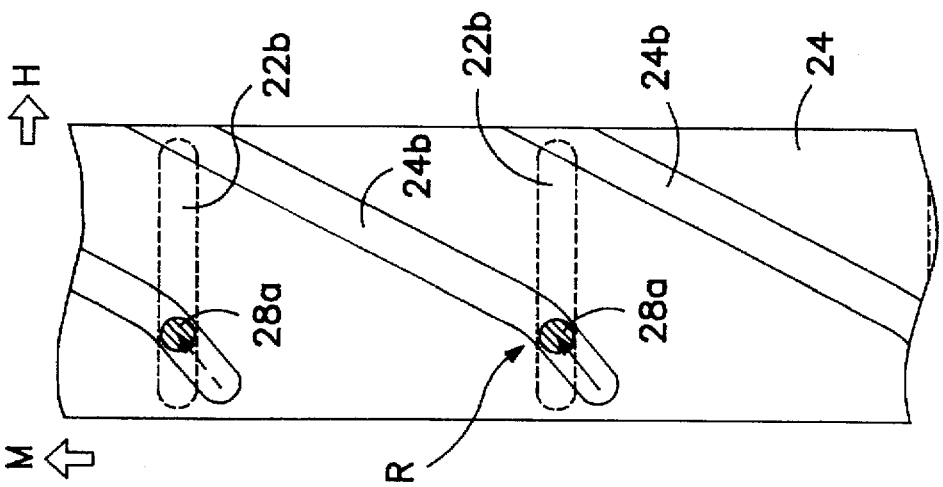
Figure 5B:
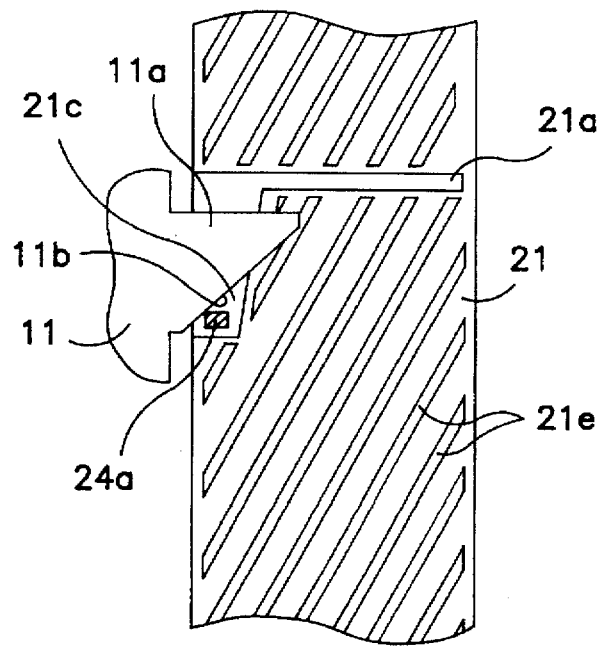

At this time, because the projecting portion 24a of the zoom cam ring 24 moves into a position which corresponds to the run-off portion 21c in the rectilinear groove 21a of the helicoid ring 21, the zoom cam ring 24 is not controlled by the rotation of the helicoid ring 21. Accordingly, the lens barrel body 22, the helicoid ring 21, and the zoom cam ring 24 move to the film surface side, moving along the sloping portion 11b of the projecting portion 11a of the camera body frame 11, and enter the collapsed state as shown in FIG. 5(b). Because zoom cam 24 performs a rotation and a reverse rotation at the time of retraction of the lens barrel body 22, the guide pins 28a, as shown in FIG. 4(a), using a portion of the Tele side of the cam groove 24b as the cam groove for collapsing use, move to the collapsed position R in the direction of the photographic subject along this groove wall, and enter the collapsed state as shown in FIG. 1.

In contrast to this, in the case of extension of the lens barrel body 22, by the reverse of the operations described above, the movement from the collapsed state to the Wide state is obtained by the second lens group 26 and the lens holder 28, and the urging force of the compression coil spring 29 being urged in the film surface direction. Namely, by the urging force of the compression coil spring 29, because the cam groove 24b is caused to move in the upward direction in FIG. 4(a), the guide pins 28a are compressed by the groove wall surface of the cam groove 24b. Due to this force component, the projecting portion 24a of the zoom cam 24 is pressed against the sloping surface 11b in the projecting portion 11a of the camera body frame 11. Furthermore, when the extension movement continues, the projecting portion 24a of the zoom cam 24 moves from the sloping surface 11b of the body frame projecting portion 11a to the rectilinear groove 21a. As shown in FIG. 4(b), it enters the Wide state, and when a further extension operation is performed it enters the Tele state as shown in FIG. 4(c).

The structure of this embodiment of the present invention solves the problem of the inconvenience in the prior art when forming the cam groove 24b to the zoom cam 24.

Namely, the zoom cam 24, by driving in the same direction of rotation as the direction of driving to the Wide position from the Tele position, caused the second lens group 26 to be closest to the first lens group 25, because the lens barrel body 22 of the lens barrel 12 is caused to collapse within the camera body 10. In the prior art, it is necessary to form a groove portion for collapsing use, folding into an abbreviated character form in the Wide side of the cam groove 24b in the zoom cam ring 24. However, in order to design the camera more compactly, making the angle of inclination gentle on the outer circumference of the zoom cam 24 of this kind of cam groove 24b, it is necessary to make it long, and because of this, the groove 24c used for collapsing, extended as shown at 24d in the Figure, interfered with the other cam groove 24b, making greater compactness impossible. The present embodiment example solves this problem.

In the drive mechanism of a zoom type lens barrel 12 in a collapsible mount type camera according to the preferred embodiment of the present invention, in order to detect the movement position of the helicoid ring 21 which is the tube movable in the optical axis direction of this lens barrel 12, a predetermined position between the Wide position and the collapsed position of the lens barrel is set as a standard position. A lens barrel standard position detection device 40 detects that the helicoid 21 has reached this standard position, as shown in FIGS. 1–3, and is arranged near the end portion of the film surface side of the outer circumference of the fixed tube 20.

Namely, in the present invention, as shown in FIGS. 6–9, a lens barrel is equipped with a drive mechanism. This is achieved by the helicoid ring 21 having on its outer circumference the male helicoid 21d (having a helicoid crest shown by the symbols 48 and 48A in FIG. 7) in engagement with the female helicoid 20b (having a helicoid crest shown by the symbol 49 in FIG. 7 and a helicoid trough shown by the symbol 51 in FIG. 7) on the inner circumference of fixed tube 20. The detection device 40 detects the predetermined standard position in the range of movement of helicoid ring 21 in the optical axis direction. The lens barrel standard position detection device 40 operates by a working plane (corresponding to a sloping surface described later) 50 arranged in a portion of the side surface of the crest 48A of the male helicoid 21d of the helicoid ring 21.

The lens barrel 12 moves from the collapsed state shown in FIG. 1 through the Wide state shown in FIG. 2 into the Tele state shown in FIG. 3, during which, the helicoid ring 21 moves back and forth along the optical axis direction extending over the range of movement shown in FIGS. 1–3. This embodiment example arranges the standard position between the collapsed position of FIG. 1 and the Wide position of FIG. 2 within the range of movement of the helicoid ring 21, for detection by an ON/OFF switch.

Figure 6:
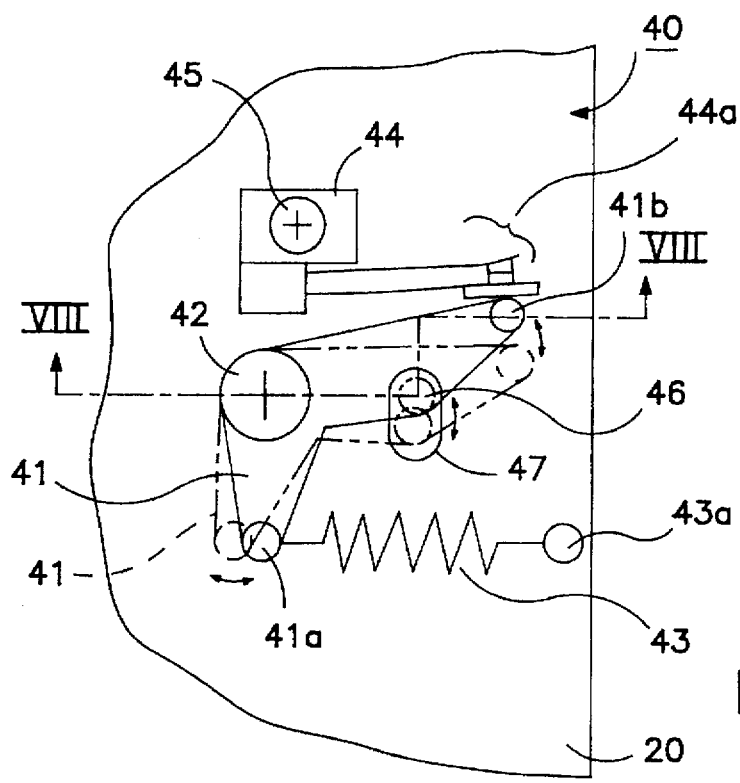
FIG. 6 is a view of the standard position detection device of the camera in accordance with a preferred embodiment of the present invention, taken from the direction of the arrow VI in FIG. 1.
Figure 7:
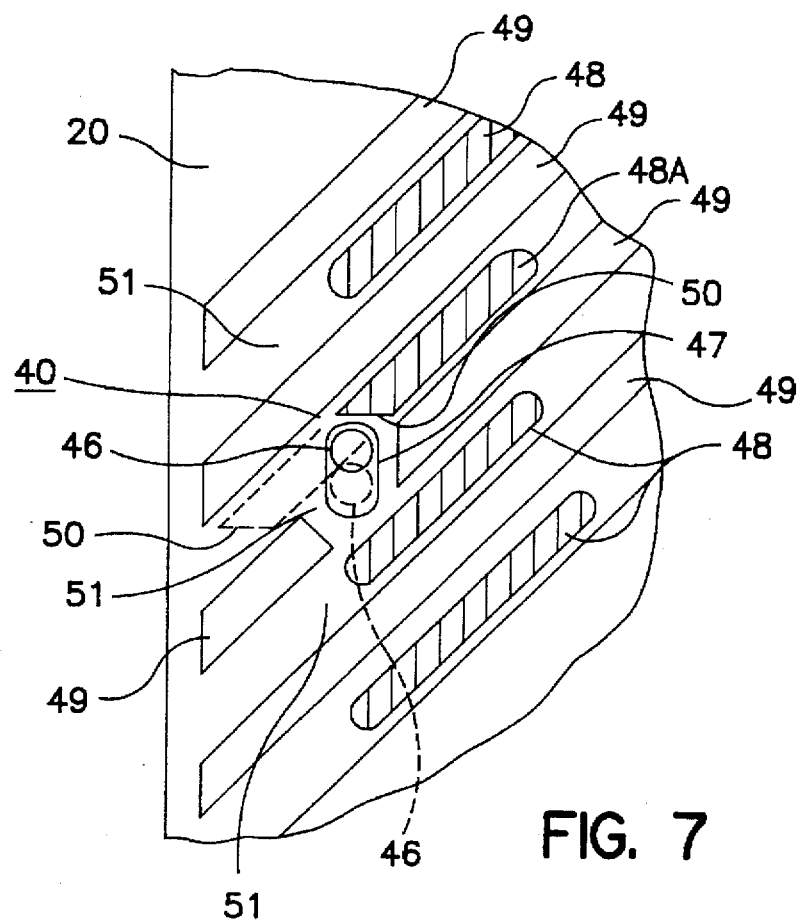
FIG. 7 is a rear view of FIG. 6.
Figure 8:
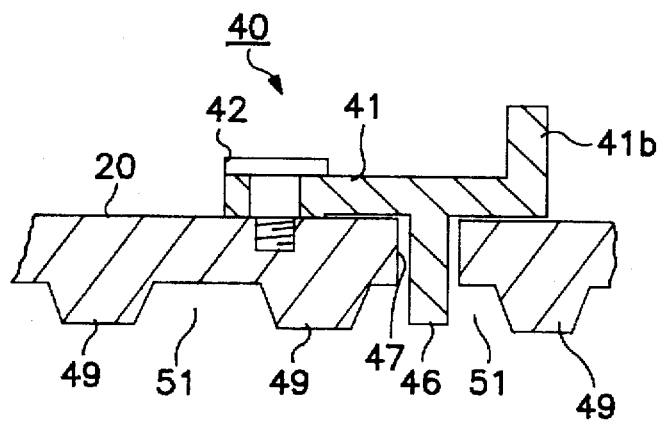
FIG. 8 is a cross-sectional diagram of line VIII—VIII of FIG. 6.

Specifically, the lens barrel standard position detection device 40, as shown in FIGS. 6–8, is equipped with a detection lever 41 which is shaft-supported to oscillate freely on the outer circumference of the fixed tube 20 by a stepped screw 42. Detection lever 41 is an actuating element which is capable of engagement with a working plane 50 of the movable tube 21 having a sloping surface inclined with respect to the advancing direction of the helicoid crest. Detection lever 41 is arranged in a portion of the crest 49 of the female helicoid 20b. Tension spring 43 is an urging member passing across between a spring peg 41a of one end of the detection lever 41 and the spring peg 43a arranged in a portion of the outer circumference of the fixed tube 20, which gives the detection lever 41 motion in a counterclockwise direction as shown in FIG. 6, to maintain the state shown by the full lines in FIG. 6.

Leaf switch 44 is a detection element, fixedly arranged by a screw 45 in the outer circumference of the fixed tube 20. The contact elements 44a of leaf switch 44 detect the rotation of the detection lever 41, by the switch going ON/OFF pressed by the compression pin 41b arranged at the other end of the detection lever 41. When the detection lever 41 obtains a state that the switch is ON, as shown in FIG. 6, the compression pin 41b at the other end places the contact elements 44a of the leaf switch 44 in contact with each other, due to the urging of the spring 43.

The detection lever 41, spring 43, and leaf switch 44 of the lens barrel standard position detection device 40 are attached, as indicated by the arrow VI in FIG. 1, to a portion of the outer circumference of the fixed tube 20. Moreover, an elongate guide hole 47 is arranged in the circumferential direction, as shown in FIG. 6 or 7, in a portion of the fixed tube 20. In addition, a connection pin 46, which faces the inside of the fixed tube 20, passes through this guide hole 47 and is arranged in a portion of the detection lever 41. The connection pin 46, as shown in FIG. 7, is positioned via the guide hole 47 arranged facing a portion of the trough 51 of the female helicoid 20b at the inner circumference of the fixed tube 20.

On the other hand, a portion of the crest 48 of the male helicoid 21d of the helicoid ring 21, namely the predetermined crest 48A, is capable of engagement with the connection pin 46 when the helicoid 21 has reached the set standard position. The portion of the crest 48A is formed as a working plane by a sloping surface. The sloping surface of the working plane 50 engages the connection pin 46 when the helicoid 21 reaches the set standard position. The working plane 50 having the sloping surface of the side surface of the crest 48A of the male helicoid 21d of the helicoid ring 21 may be a notch formed in a surface approximately parallel to the optical axis direction on the outer circumference of the helicoid ring 21. The working plane may, however, have a sloping surface inclined with a smaller angle than the angle of the advancing direction of the male helicoid crest 48A of the optical axis direction.

Figure 9:
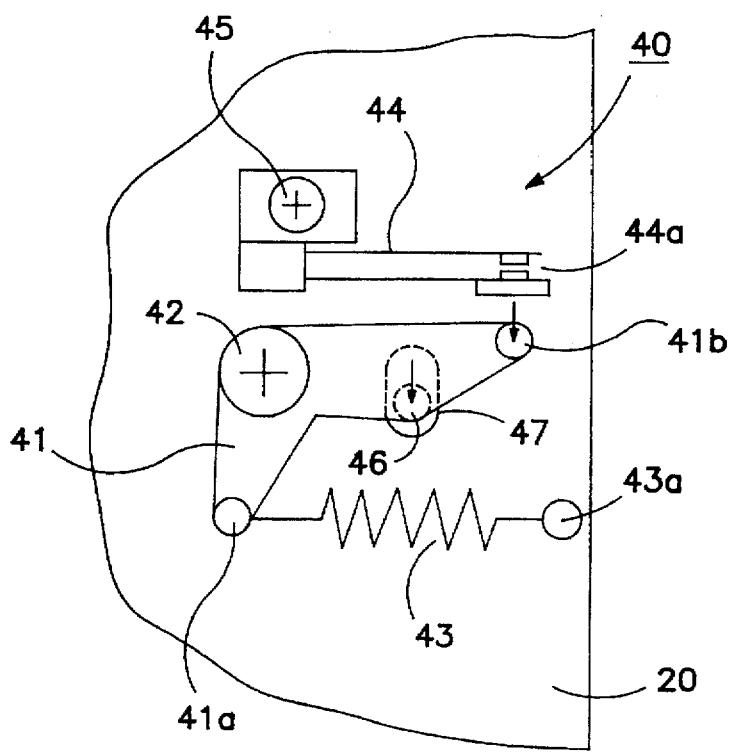
FIG. 9 is a diagram showing a state of the standard position detection device of FIG. 6.

When the lens barrel 12 moves from the Wide state of the lens barrel to become the collapsed state, the working plane 50, due to the sloping surface of the helicoid crest 48A of the helicoid ring 21, moves along the helicoid crest 49 of the fixed tube 20 side. When the working plane 50 moves further to engage the connection pin 46 of the detection lever 41 which projects from the guide hole 47, it pushes aside the connection pin 46. At this time, the connection pin 46 moves in the guide hole 47 from the position shown in FIG. 7 by a full line to the position shown by the imaginary line. The lever 41, as shown in FIG. 6, then rotates from the state shown by the full line to the state shown by the imaginary line, opposing the urging of spring 43, causing the contact terminals 44a of the leaf switch 44 to separate and to turn the switch OFF, as shown in FIG. 9.

Thus, the detection of whether or not the helicoid ring 21 of the lens barrel 12, which moves back and forth in the optical axis direction, is positioned in the standard position is reliably and accurately performed with lens barrel standard position detection device of the present invention, having a simple structure and providing accurate results. Moreover, because the lens barrel standard position detection device 40 includes a working plane 50, having a sloping surface formed by notching a portion of the crest 48A of the helicoid, and a leaf switch 44 set ON/OFF by a detection lever 41 having a connection pin 46 in engagement with the working plane 50, the number of components is small, the insertion space is also small, and as a result the camera can be compactly designed. Moreover, excellent ease of assembly and reduction in cost become possible. The lens barrel standard position detection device 40 as described above, by means of a switch 44 which is ON or OFF as a detection element, obtains a signal to reset a counter when the lens barrel is driven, to perform a confirmation of the standard position of the lens barrel. Moreover, when the lens barrel moves from the collapsed state to the Wide state, it goes without saying that operations which are the reverse of the above are performed.

Further, because the detection device is actuated by a working plane of a helicoid crest of the moving tube the lens barrel standard position detection can be reliably performed. In particular, the detection of the standard position of a lens barrel which moves back and forth in the optical axis direction can be reliably and accurately performed by means of a simple structure, and in addition, a reduced size of the device is possible, and by this means the camera body can be more compactly designed. Moreover, by means of the present invention, the assembly of the lens barrel standard position detection device can be performed relatively simply, the assembly characteristics are excellent, and cost reduction becomes possible.

Moreover, by means of the present invention, the lens barrel standard position detection device includes a movable actuating element coupled to a working plane by means of a sloping surface of a helicoid crest of a movable tube, an urging member which maintains this actuating element in a predetermined position, and a detection element which detects the movement of this actuating element from the predetermined position when the actuating element moves in opposition to the urging force of this urging means. The result is that a design can be obtained for cost reduction from the aspects of simplification of the structure and ease of assembly.

Furthermore, by means of the present invention, in the lens barrel standard position detection device, the end portion of the actuating element which moves, coupling to the working plane by means of the sloping surface of the helicoid crest of the movable tube, is positioned in the helicoid trough of the fixed tube. The detection member which detects the movement of the actuating element is arranged in the outer circumference of the fixed tube. By forming the working plane of the helicoid of the movable tube with a surface approximately parallel to the optical axis on the outer circumference of the movable tube, or with an inclined surface having a smaller angle than the angle of advance of the male helicoid crest to the optical axis direction, generally excellent results can be manifested by means of the operating effects described above.

The present invention is not limited to the embodiment example structure described above, and it goes without saying that the form, structure and the like can be suitably modified or changed for each part of each mechanism in the camera, including a collapsible mount camera or a zoom type lens barrel 12 and the like. For example, in the embodiment example described above, the example has been described using two lens groups 25 and 26, but there is no limitation to this, and it can of course be applied to one equipped with plural lens groups. Essentially, it may be a camera having a drive mechanism to cause the extension and retraction operations of the lens barrel 12. Moreover, in the embodiment example described above, of the lens barrel standard position detection device 40, the detection lever 41 and leaf switch 44, etc., have been used. However, an actuating element moved by means of a working plane arranged in a helicoid crest, and a detection element which can detect the movement of this actuating element can be any generally widely known detection mechanisms.

Although preferred embodiments have been shown and described, it would be appreciated by those skilled in the art that changes may be made in these embodiments without departing from the principles and spirit of the invention, the scope of which is defined in the claims and their equivalents.

What is claimed is:

1. A camera lens barrel comprising:
   a fixed tube integrally fixed to said camera and having a first member on an inner circumferential portion of said fixed tube;
   a movable tube which rotationally moves in said back and forth direction along said optical axis said movable tube having a second member on an outer circumferential portion of said movable tube which engages said first member of said fixed tube; and
   a lens barrel standard position detection device, arranged on an outer circumferential portion of said fixed tube, to detect when said movable tube moves to a predetermined standard position on said optical axis by detecting a state of the second member.

2. The camera according to claim 1, wherein said second member is a male helicoid member and includes a crest having a working plane portion which actuates said lens barrel standard position detection device when said movable tube moves to said predetermined standard position.

3. The camera according to claim 2, wherein said lens barrel standard position detection device includes:
   an actuating element movable between a first position and a second position, said actuating element moving to said second position when said working plane portion of said crest moves into contact with said actuating element corresponding to said movable tube reaching said predetermined standard position;
   an urging member which maintains said actuating element in said first position in a normal state due to an urging force of said urging member; and
   a detection unit which detects when said actuating element moves to said second position which opposes said urging force of said urging member.

4. The camera according to claim 3, wherein an end portion of said actuating element is disposed in a trough of said first member, which is a female helicoid member, of said fixed tube and comes into contact with said working plane portion of said crest of said male helicoid member of said movable tube when said movable tube reaches said predetermined standard position.

5. The camera according to claim 3, wherein said detection unit is disposed on said outer circumferential portion of said fixed tube.

6. The camera according to claim 3, wherein said detection unit is a switch having contact terminals which separate to turn said switch OFF when said actuating element moves to said second position.

7. The camera according to claim 2, wherein said working plane portion of said crest is a sloping surface inclined at an angle with respect to an advancing direction of said crest of said male helicoid member of said movable tube along said optical axis.

8. The camera according to claim 2, wherein said working plane portion of said crest is a surface parallel to said optical axis.

9. The camera according to claim 1, wherein said predetermined standard position is located between a wide angle position of said zoom type lens barrel and a retracted position of said zoom type lens barrel.

10. A camera as recited in claim 1, wherein the lens barrel is a zoom type lens barrel for telephoto and wide angle photography, which zoom type lens barrel extends from and retracts into a body of said camera in a back and forth direction along an optical axis of said zoom type lens barrel.

11. A camera as recited in claim 10, wherein the fixed tube is integrally fixed to a frame in said camera body.

12. A lens barrel standard position detection device, attached to a lens barrel equipped with a fixed tube having a first member and a movable tube rotationally moving back and forth along an optical axis of said lens barrel and having a second member engaging said first member of said fixed tube, said lens barrel standard position detection device comprising:

an actuating element movable between a first position and a second position, said actuating element moving to said second position when a working plane portion of said second member moves into contact with said actuating element corresponding to said movable tube reaching a predetermined standard position along said optical axis;

an urging member which maintains said actuating element in said first position due to an urging force of said urging member; and a detection unit which detects when said actuating element moves to said second position which opposes said urging force of said urging member, thereby detecting said movable tube reaching said predetermined standard position.

13. The device according to claim 12, wherein an end portion of said actuating element is disposed in a trough of said first member of said fixed tube and comes into contact with said working plane portion of said second member of said movable tube when said movable tube reaches said predetermined standard position.

14. The device according to claim 13, wherein said detection unit is disposed on an outer circumferential portion of said fixed tube.

15. The device according to claim 12, wherein said working plane portion is a sloping surface inclined at an angle with respect to an advancing direction of said second member of said movable tube along said optical axis.

16. The device according to claim 12, wherein said working plane portion is a surface approximately parallel to said optical axis.

17. The device according to claim 12, wherein said detection unit is a switch having contact terminals which separate to turn said switch OFF when said actuating element moves to said second position.

18. A method of detecting when a movable tube of a zoom type lens barrel reaches a predetermined standard position on an optical axis of said zoom type lens, comprising the steps of:

urging an actuating element to remain in a first position due to an urging force;

moving a movable tube having a second member with a working plane portion back and forth along said optical axis;

moving said working plane portion into contact with said actuating element when said movable tube reaches said predetermined standard position;

moving said actuating element to a second position opposing said urging force when said working plane portion contacts said actuating element at said predetermined standard position; and detecting when said actuating element moves to said second position.

19. The method according to claim 18, wherein said detecting step includes the step of separating contact terminals of a switch to turn said switch OFF when said actuating element moves to said second position.

20. The method according to claim 19, further comprising the steps of:

providing an end portion of said actuating element in a trough of a first member of a fixed tube of said zoom type lens barrel;

engaging said first member of said fixed tube with said second member of said movable tube;

providing said switch on an outer circumferential portion of said fixed tube; and moving said working plane portion of said second member into contact with said end portion of said actuating element.

* * * * *